UNITED STATES PATENT OFFICE.

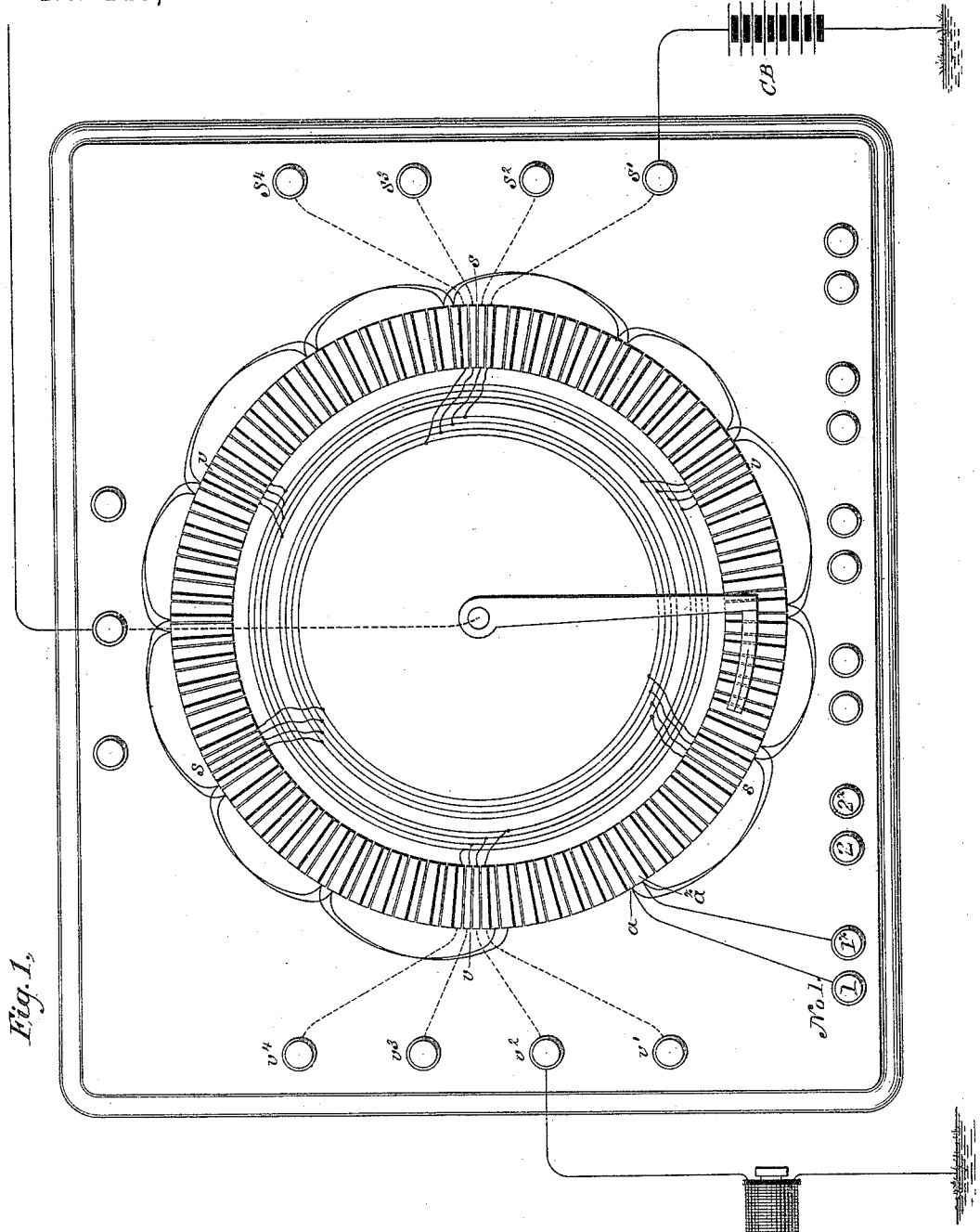

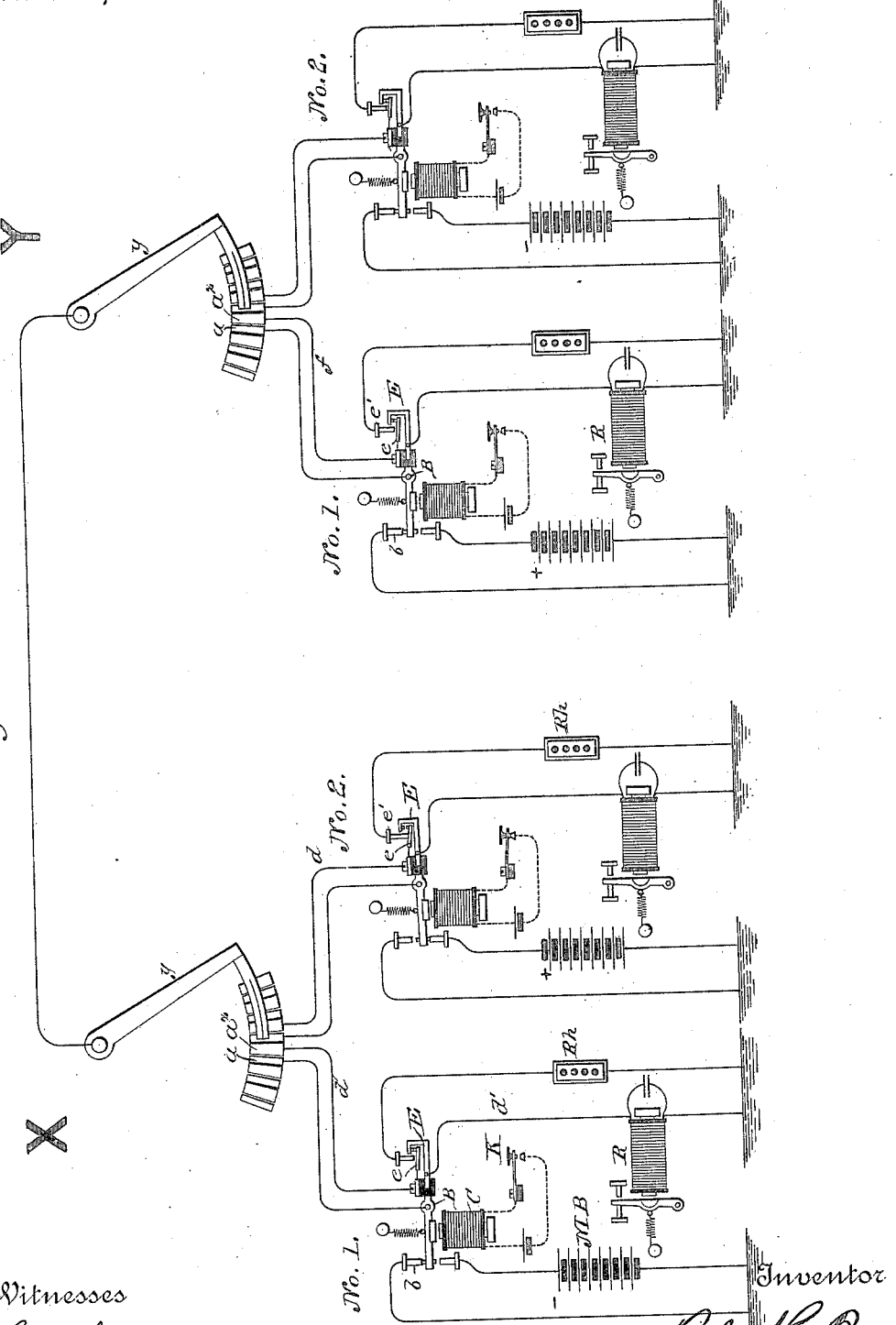

ROBERT G. BROWN, OF BROOKLYN, ASSIGNOR TO THE STANDARD MULTIPLEX TELEGRAPH COMPANY, OF NEW YORK, N. Y.

TELEGRAPHY.

SPECIFICATION forming part of Letters Patent No. 446,424, dated February 17, 1891.

Application filed March 6, 1886. Serial No. 194,302. (No model.)

*To all whom it may concern:*

Be it known that I, ROBERT G. BROWN, of Brooklyn, in the State of New York, have invented certain new and useful Improvements in Telegraphy, of which the following is a specification.

The particular system of telegraphy to which my invention relates is what is known as "synchronous telegraphy" or "synchronous multiplex telegraphy," and especially the system shown in various patents granted to Mr. Patrick B. Delany.

For the purposes of this specification special reference is made to Patents Nos. 286,274 and 286,281, because they show a system of reciprocal correction of the apparatus at two connected stations. In that system of telegraphy with which electricians are now familiar a number of segments arranged in a circle at each end of a main line is divided between several pairs of operators, so as to split up or divide the line for multiplex transmission. These tables of contacts or segments are traversed by synchronously rotating trailers or circuit-completers; and when these trailers rest upon corresponding segments the corresponding operators connected with such segments are in electrical communication. It will be noted that in such an arrangement the correct operation is dependent upon the trailer at one station being upon a given segment while the trailer at the other station is upon a corresponding segment, and that a transmitting-battery be connected with one of the segments. An electric current, however, sent into one end of a line requires an appreciable time to manifest itself at the other end of the line. The distance through which the system of telegraphy above referred to can be made to operate is therefore limited more or less, because on long circuits the trailers will pass from a pair of corresponding segments onto others with which the particular operators may not be connected before the current which is sent into one end of the line will manifest itself at the other end.

The object of my invention is to remedy this difficulty and to adapt the system for use on long lines. This I accomplish by charging the line with electricity when the trailers are upon one pair of corresponding segments and then producing the signal by the discharge or passage of electricity from the line when the trailers have passed onto another pair of adjoining segments. Obviously it is immaterial whether this discharge from the line which produces the signal at the receiving-station is the ordinary static discharge of a continuous conductor caused by the breaking of the circuit when the trailers pass from the first pair of corresponding segments to the second pair, or whether a condenser be placed in the main line.

In the accompanying drawings, Figure 1 is a diagram view, showing a base-board and a table of contacts or segments arranged thereon, and Fig. 2 is a diagram view showing portions of a table of contacts at two connected stations with the local-circuit connections and instruments for two pairs of operators.

On the table of contacts illustrated in Fig. 1 I have shown one hundred and forty-four message-segments and six groups of four small segments, disposed at equal intervals around the tables, which latter segments are devoted to maintaining the synchronous movement of the apparatus. These "correcting-segments," as they are termed, are referred to hereinafter. For the present it will be assumed that the apparatus at the two stations are running synchronously.

In Patent No. 286,273, granted to P. B. Delany October 9, 1883, there are shown and claimed what are called "static-discharge contacts" arranged between the message-contacts. Their function is to discharge the line after each break, so that the line will be in proper condition for the reception of the next impulse from the battery, which will pass into the line when the trailers at the two stations come upon the next pair of corresponding segments. I preferably dispense altogether with such ground or discharge contacts, and use a supplementary message-segment, which occupies the position of the ground or static discharge contact shown in the Delany patent.

Referring now to the particular organization illustrated in the drawings, Fig. 1 is a diagram view illustrating a circle of segments full size, and adapted for sextuplex transmission. The binding-screws 1, $1^x$, 2, $2^x$, &c., represent the operator's connections, each operator's instrument being connected with a pair of the binding-screws for a purpose which presently appears. In this view the segments for operator No. 1 only are shown arranged in pairs $a$ and $a^x$, such pairs being placed at twelve equal intervals in the circle. All the segments $a$ of the pairs of segments are connected together and to the binding-post 1, while all the other segments $a^x$ of the pairs are connected together and to the binding-post $1^x$.

Fig. 2 shows the connection of each operator's instruments with his pairs of segments. The segments and operator's instruments are similarly connected at both stations.

Referring now specially to Fig. 2, at each station X Y is shown a portion merely of the circle of contacts. Two pairs of operator's instruments, however, No. 1 and No. 2, are shown as connected each with one of the pairs of segments devoted to their use. The first segment $a$ in each pair is preferably smaller than its mate $a^x$, and is connected with a transmitting armature-lever B, which is normally put to ground through its upper contact $b$, and may be connected with a main battery MB by the action of a magnet C included in a local circuit in which the transmitting-key K is placed. When the operator No. 1 at station X works his key, therefore, the main battery MB is thrown upon the line through the battery-segment $a$ and trailer or circuit-completer $y$. At the opposite station Y, assuming that operator No. 1 is receiving, the segment $a$ is connected to earth through the armature-lever B and its upper contact $b$. A complete circuit is therefore afforded, and the current from the battery MB at X promptly enters the line. If the line is so short as to permit the current which enters the line at X to reach the ground at Y, no effect will be produced upon the relay of operator No. 1 at station Y, while the trailers are still upon the segments $a$; but when the synchronously-moving trailers pass from the segments $a$ at each station the primary-battery circuit is broken, and when the trailers come upon the segments $a^x$ the static charge on the line discharges. The discharge from the line takes place in exactly the same way if the line is so long that the primary current cannot reach the segment $a$. At the sending-station X the transmitting armature-lever of operator No. 1 having been drawn down, as described, the parts will be in the position indicated by the apparatus of operator No. 2 at that station, and the static discharge passes from the contact $a^x$ by a wire $d$ to an insulated spring-finger $e$ on the armature B to a stop-pin $e'$ to earth, preferably through a resistance R$h$, as shown. At the apparatus of operator No. 1 at station Y, the discharge passes by a wire $f$ from segment $a^x$ to an insulated spring-finger $e$ on the armature-lever B, and the armature B being in its normal position, the spring-finger $e$ is in contact with an insulated section E of the armature-lever, which is connected through the relay R to earth. The static discharge, therefore, or the group of such discharges, will manifest itself upon the receiving-relay R and produce the desired signal. Should the line not be completely discharged through the segments $a^x$ before the trailers pass onto the adjoining segments of another pair of operators, if those operators were not working the remainder of the discharge would be put to ground through the upper contacts $b$ of the armatures B, and if such operators or either of them had their keys depressed, then the discharge would be met and wiped out by a current of an opposite polarity to the current sent in from the previous transmitting-segment.

The proportionate size of the segments $a$ relative to the speed of the circuit-completer should be so regulated as to provide for a sufficient charging of the line to produce a proper static discharge. The width of the segments $a^x$ relatively to the speed of the rotator will depend upon the length of the line, the segment being made of a sufficient width to properly receive the discharge from the line.

The resistances R$h$ are employed by preference to prevent sparking between the battery segment or contact and its mate when the trailer bridges from one of the segments to the other.

The arrangement of spring-finger $e$, stop $e'$, and insulated section E of the armature-lever B is such that when the armature moves from its upper contact $b$ the spring-finger $e$ is disconnected from the armature-section E and put in contact with the stop $e'$ just before the armature-lever B is connected with the main battery MB.

The dark lines which separate the pairs of segments indicate strips of insulating material, such as ivory or strips of some insulated material, which, being arranged flush with the faces of the segments, prevent the trailer from short-circuiting the main battery of one operator through the receiving-relay of the adjoining operator as the trailer passes from a receiving-segment to a battery-segment.

Referring to the three groups of correcting-segments $s$ in Fig. 1, the first segments in the groups are connected together and to a binding-post $s'$. The second segments are similarly connected to a binding-post $s^2$, the third to a binding-post $s^3$, and the fourth to a binding-post $s^4$. The segments of the other three groups of correcting-segments $v$ are similarly connected each to a binding-post $v'$ $v^2$ $v^3$ $v^4$. The arrangement at the other station may be just the same, except that the respective positions of the groups of segments $s v$ are reversed. If the line is a short one the correcting-segments may be connected as follows: The post $s'$ being connected with the correcting-battery CB, the first segment in each group *s* will be in connection with the battery. One or more of the remaining three segments in each group may be grounded. The correcting impulse from the battery CB is therefore sent to the distant station through the first segment in each group of correcting-segments *s*. The other groups of correcting-segments *v*, which receive the impulses from the distant station may be corrected as follows: The second segment in each group is connected to ground through the correcting-relay by grounding the binding-post $v^2$, as shown. The first segment and the last two may be put direct to ground. On longer lines the segments *s* may be connected as before described; but of the receiving-segments *v*, the first two and the last may be put to ground and the correcting-relay connected to the third. On still longer lines the first two segments of the groups *s* may be connected to the battery and the correcting-relay connected with the last segments in each group *v*, the other segments in each group *v* being grounded, if desired. These segments might be connected in any other way to accomplish the purpose.

If all the segments *s* were connected with the battery CB and all the segments *v* with the correcting-relay the operation of correction would be analogous to the operation described in Mr. Delany's patents before mentioned; but when connected in the way I have described the correction of the apparatus will be effected by the static discharge from the line.

As fully described in Mr. Delany's patents, before mentioned, the corrections being reciprocal from one station to the other, the trailers will be kept in an approximately perfect synchronism.

The particular form of relay illustrated has been heretofore patented to Mr. Delany and needs no description here, this invention not being in any way dependent upon it.

It will be obvious that the receiving operator can at any time break the sender, as the arrangement of contacts E *e e'* gives this capacity.

I make no claim to the method of sending signals over a telegraphic circuit which consists in sending impulses of electricity into the line at one station through a segment and receiving said impulses at another station through a segment so located according to the "time" of the length of the line that when the trailer reaches said segment the arrived current will be discharged into it, as this is the invention, so far as I am aware, of Patrick B. Delany.

I make no claim herein to the following combination of elements: A traveling circuit-closer, two contacts arranged side by side, a battery from which a current may be sent into the line through the first of said contacts, and a receiving-relay connected with the second set of said contacts, as this constitutes the subject-matter of a separate application filed by me on the 6th day of March, 1886, and bearing serial No. 194,303.

I claim as my invention—

1. In a synchronous telegraph, the combination of a pair of trailers, one at each end of a main line, a pair of adjoining segments at each end of said line, over which the trailers pass, respectively, the first of each of said segments being connected to earth through the back stop of a transmitter and to a battery through the front contact of said transmitter, in combination with a receiving-relay connected to each of the second of said segments, substantially as described.

2. In a synchronous telegraph, the combination of a trailer at each end of a main line and sets of segments arranged in successive pairs, the first segments of each of said pairs being connected normally to earth through the back contact-stop of a transmitter, the front contact-stop adapted to be connected with a transmitting-battery, and a receiving-instrument connected to the second of each pair of segments with a normally-open shunt around the receiver, including a rheostat, substantially as described.

3. The combination, in a synchronous telegraph, of a traveling circuit-completer, a pair of adjoining contacts connected with an operator's instruments, the first of said contacts being normally connected to the earth, a transmitting-battery with which said contact may be put in connection when disconnected from the earth, and a receiving-relay which is normally in connection with the second of said contacts.

4. The combination, in a synchronous telegraph, of a traveling circuit-completer, a pair of adjoining contacts connected with an operator's instruments, the first of said contacts being normally connected to the earth, a transmitting-battery with which said contact may be put in connection when disconnected from the earth, a receiving-relay which is normally in connection with the second of said contacts, and electrical connections whereby the relay is disconnected from said second contact and the contact put to earth when the transmitting-battery is sent to line through the first of said contacts.

5. In a synchronous telegraph, the combination of a traveling circuit-completer, a pair of adjoining contacts connected with an operator's instruments, an armature with which the first of said contacts is connected, an earth connection against which said armature normally rests, a transmitting-key for disconnecting the armature from the ground and connecting it with a transmitting-battery, a relay normally connected with the second of said contacts, and electrical contacts and connections whereby the relay is disconnected from the second contact and said contact put to earth after the armature has been disconnected from the earth and before it has been connected with the transmitting-battery.

6. The combination of a main line, synchronously-traveling circuit-completers at each end of the main line, a contact at one end of the line, through which a current from a transmitting-battery may be sent to line at the will of the transmitting operator, and a receiving-contact at the other end of the line, with which the corresponding operator's receiving-relay is connected, the latter contact occupying a position relatively in advance of the position of the battery-contact at the other station, for the purpose set forth.

7. The combination of a main line, synchronously-actuated circuit-completers at each end of the line, corresponding pairs of adjoining contacts at each end of the line, connected with corresponding operator's instruments, the first contact of each pair at each station being normally connected to the earth, the second contact in each pair at each station being normally connected with a receiving-relay, and a transmitting battery or batteries at each station from which transmitting impulses of electricity may be sent into the line through the first contacts in said pairs.

In testimony whereof I have hereunto subscribed my name.

ROBERT G. BROWN.

Witnesses:
J. A. F. SIMPSON,
WM. W. WIGHT.